H. A. AND W. H. INMAN.
RECEPTACLE MAKING MACHINE.
APPLICATION FILED APR. 26, 1920.

1,395,229.

Patented Oct. 25, 1921.
11 SHEETS—SHEET 3.

INVENTORS
Harry A. Inman
BY William H. Inman
their ATTORNEY

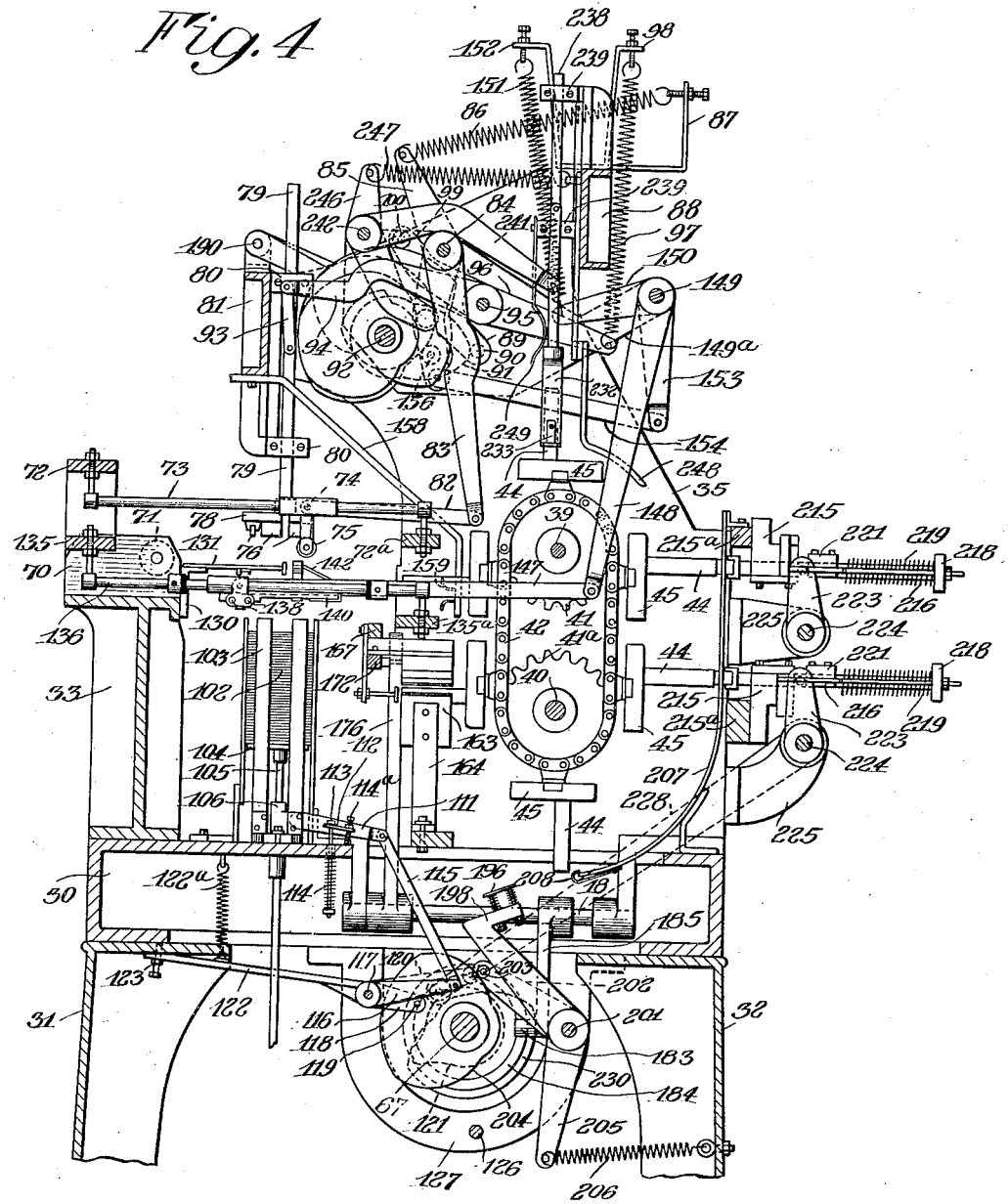

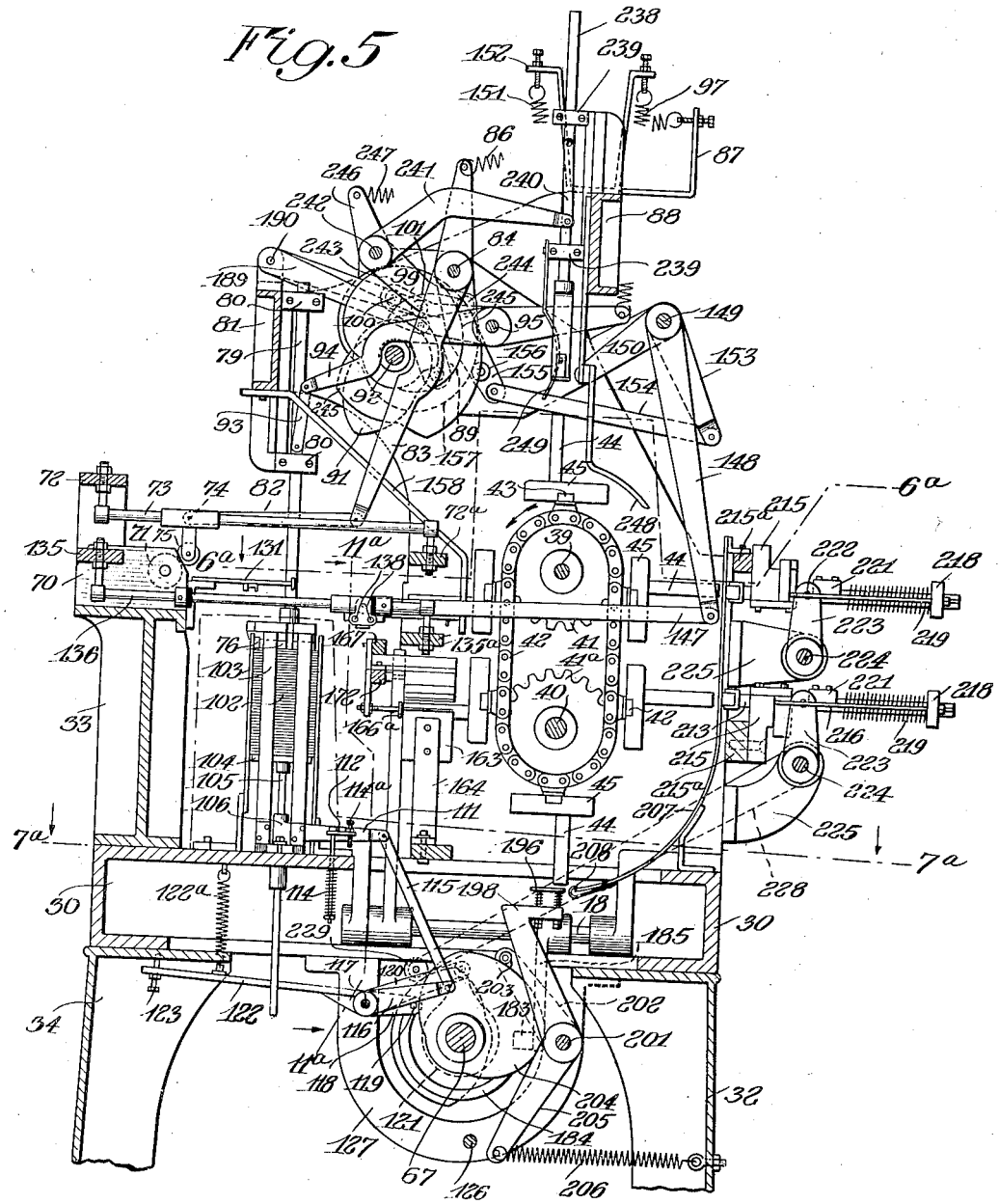

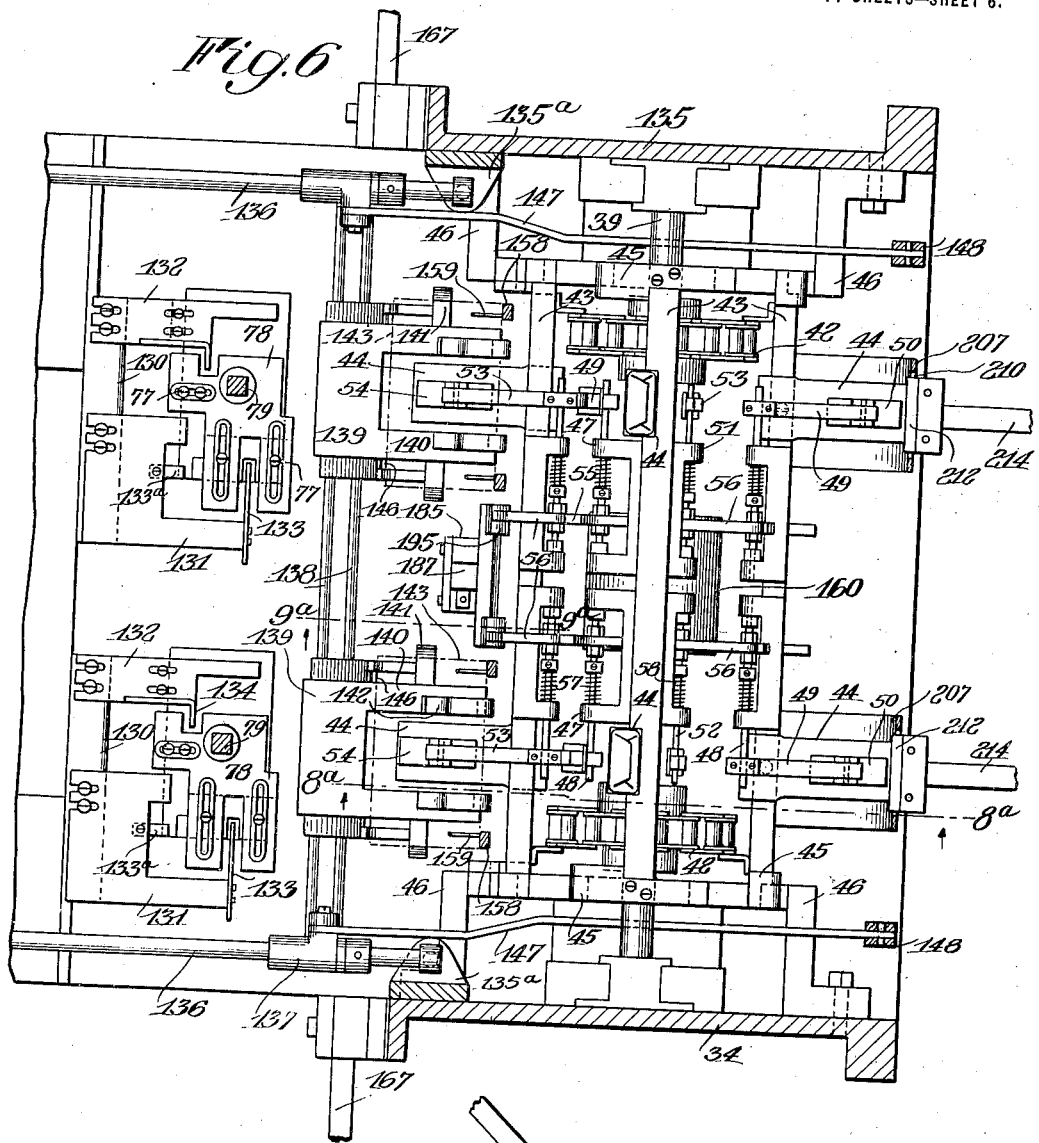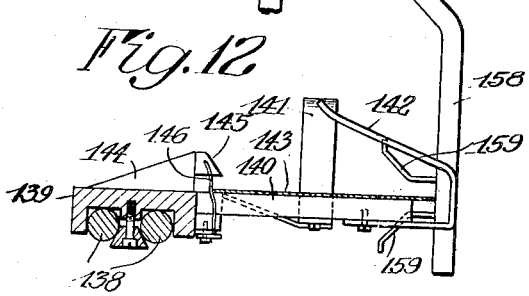

H. A. AND W. H. INMAN.
RECEPTACLE MAKING MACHINE.
APPLICATION FILED APR. 26, 1920.

1,395,229.

Patented Oct. 25, 1921.

INVENTORS
Harry A. Inman
BY William H. Inman
their ATTORNEY

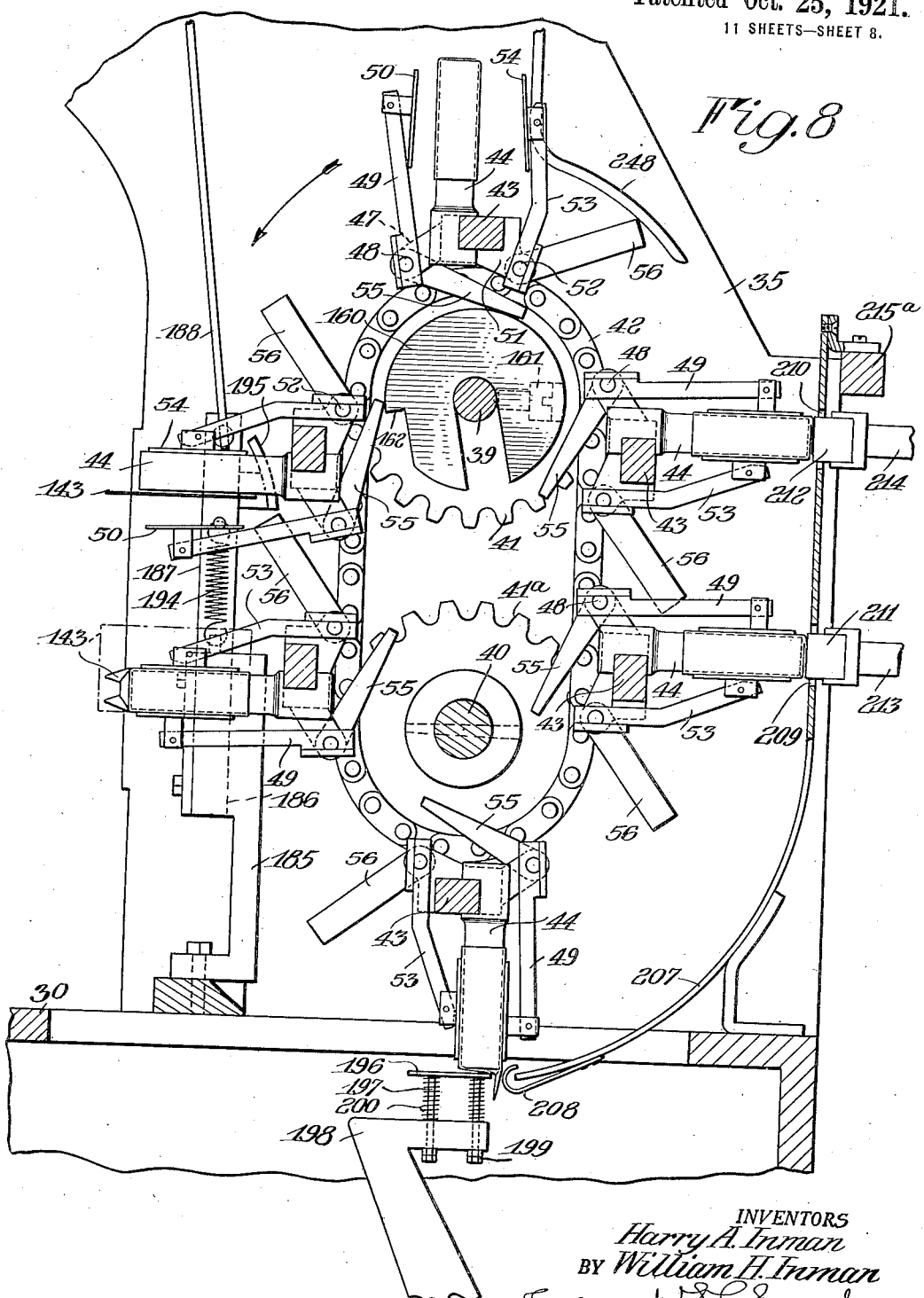

H. A. AND W. H. INMAN.
RECEPTACLE MAKING MACHINE.
APPLICATION FILED APR. 26, 1920.

1,395,229.

Patented Oct. 25, 1921.
11 SHEETS—SHEET 9.

INVENTORS
Harry A. Inman
William H. Inman
BY
Frederick S. Church
their ATTORNEY

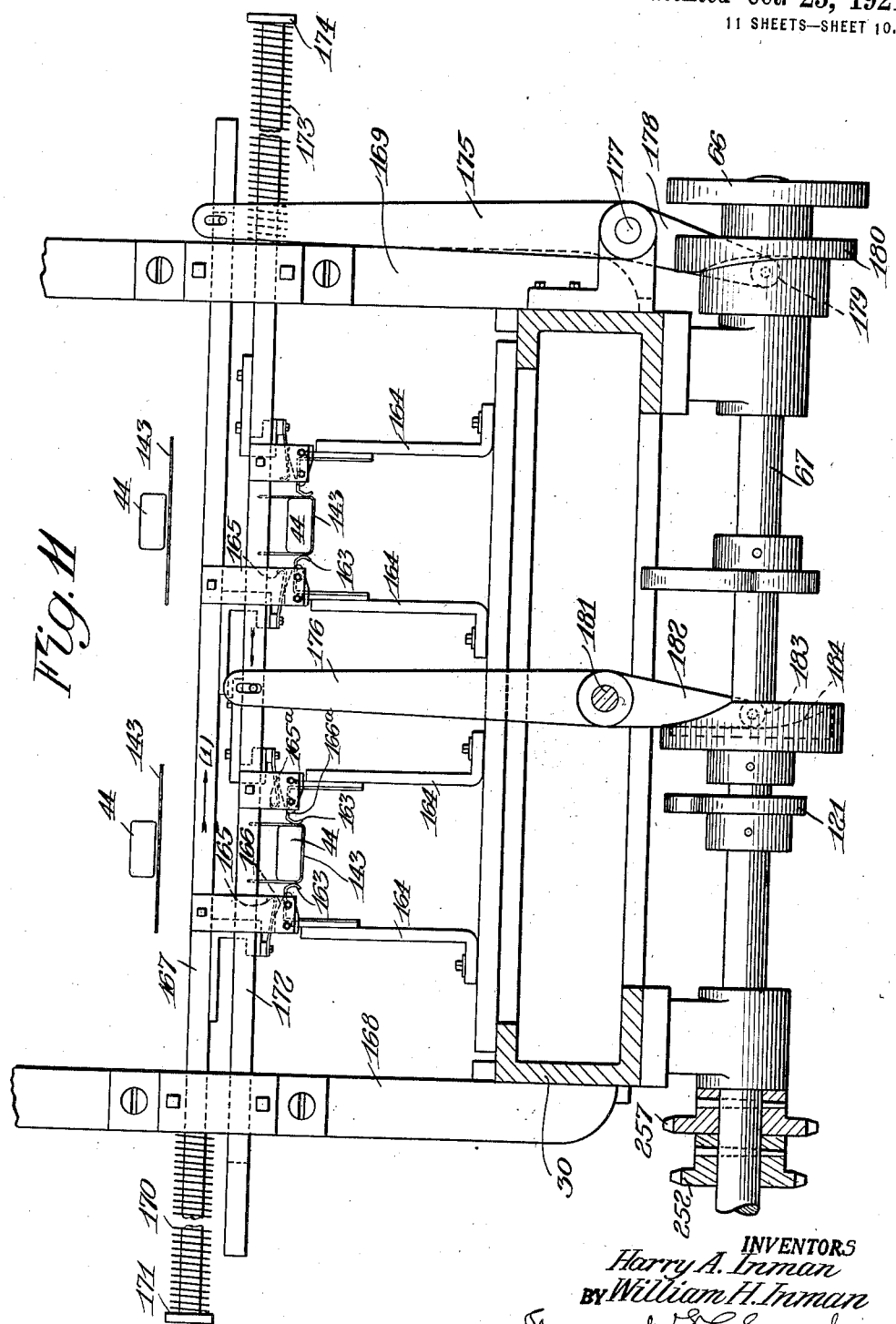

UNITED STATES PATENT OFFICE.

HARRY A. INMAN AND WILLIAM H. INMAN, OF NEWARK, NEW YORK.

RECEPTACLE-MAKING MACHINE.

1,395,229.            Specification of Letters Patent.    Patented Oct. 25, 1921.

Application filed April 26, 1920. Serial No. 376,811.

*To all whom it may concern:*

Be it known that we, HARRY A. INMAN and WILLIAM H. INMAN, citizens of the United States, residing at Newark, in the county of Wayne and State of New York, have invented certain new and useful Improvements in Receptacle-Making Machines; and we do hereby declare the following to be a full, clear, and exact description of the same, reference being had to the accompanying drawings, forming a part of this specification, and to the reference-numerals marked thereon.

This invention has to do with the making of receptacles or containers, of paper or other suitable material, for packaging articles for market, and relates more particularly to machines for manufacturing containers of this character such, for example, as are commonly used for packaging cigarettes and similar articles.

One object of the invention is the provision of a machine of the above character which is practical in construction, and rapid, accurate and efficient in operation.

Another object is the provision of a machine of this type operating to move the blank from one of a plurality of movable forming devices to another in successive operating positions, and provided with stationary devices intermediate said positions operating automatically to form the blank during the movement of the latter from position to position, thereby simplifying the machine and increasing the rate of production.

Another object is to provide such a machine having compact and rapidly operating blank folding devices combined with fold pressing devices adapted to maintain a pressure on the glued folds of the blank for an appreciable period as the latter passes through the machine to insure the setting of the glue and the fixing of the folds before the blank is released.

Another object is to supply a forming mechanism comprising in addition to the folding devices, a plurality of pressing devices and a number of formers or mandrels equal to or exceeding the number of said devices, so that the latter operate simultaneously on a plurality of successive blanks to fold the latter and apply repeated pressure to the completed folds until the glue is more or less set, without reducing the speed of output of the machine.

Another object is to provide such a machine adapted for forming containers open at one end and folded and closed at the other, having means for accurately positioning the blank with reference to the forming mechanism so that inaccuracies which may occur in the blank are thrown in the folded end portions thereof and thus prevented from appearing in the finished container.

Another object is to provide an improved mechanism for rapidly gumming the blanks and supplying the latter to the forming mechanism by a carriage yieldably supporting the blanks, combined with stationary means for gaging and positioning the blanks on the carriage so that they are accurately presented to the forming mechanism.

Still another object is to provide folding and pressing devices having effective blank engaging parts so that the glue blank is folded closely and accurately about the former or mandrel, and the folds securely pressed and permanently fixed in position. To these and other ends the invention consists in certain improvements and combinations of parts, all as will be hereinafter more fully described, the novel features being pointed out in the claims at the end of the specification.

In the drawings:

Fig. 4 is a sectional view on the line 4ª—4ª of Fig. 3, showing the working parts in one position.

Fig. 5 is a similar view showing the parts in another position.

Fig. 6 is a section on the line 6ª—6ª of Fig. 5.

Fig. 8 is an enlarged sectional view on the line 8ª—8ª of Fig. 6, showing the mandrel carrier and associated parts.

Fig. 11 is an enlarged sectional view on the line 11ª—11ª of Fig. 5, showing some of the folding devices.

Fig. 12 is an enlarged sectional elevation of one of the carriages for feeding the blanks to the mandrels.

Figure 1:
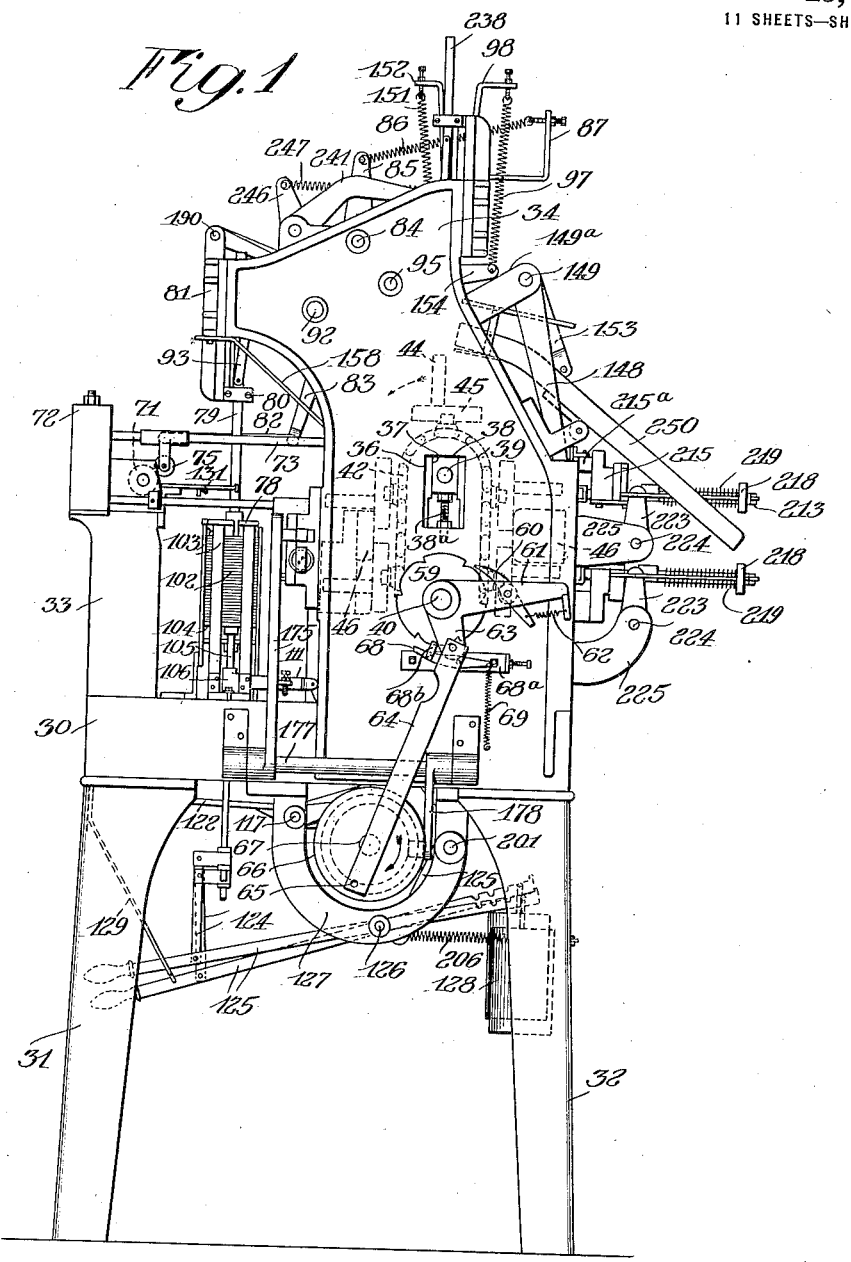
Figure 1 is a side elevation of a machine embodying the present invention.

Figs. 15 to 20 inclusive are enlarged perspective views of the mandrel and blank showing progressive steps in the folding of the latter.

Similar reference characters throughout the several views indicate the same parts.

The embodiment of the invention at present preferred as best illustrating its principles comprises a practical and fully automatic machine for rapidly and accurately gumming and folding blanks of paper, or other suitable material, into commercial article receptacles or containers, being particularly adapted for the manufacture of the paper containers or cups, of generally tubular shape open at one end and closed at the other, in which cigarettes, cigars and like articles are commonly sold. For the purpose of increasing the rate of production, while at the same time reducing the number of working parts and the cost of the machine, the latter is preferably built with multiple working units, in the present instance two in number, as shown in the drawings. Each of the units comprises means for gumming and feeding the blanks one at a time from a supply stack thereof to the forming devices. The latter comprise, generally speaking, a carrier having a plurality of blank carrying forms or mandrels which are moved into successive coöperation with a plurality of blank folding devices, a plurality of devices for pressing the gummed folds of the blank, and finally with a stripping or discharging means which removes the completed receptacles from the mandrel and discharges them from the machine. The novel and advantageous construction, arrangement and operation of the machine and its parts will now be described in detail. Referring more particularly to the drawings, the machine comprises, preferably, a main frame including a bed or table 30 supported on front and rear pairs of legs 31 and 32, respectively. Rising from the bed are a front standard 33 and side standards 34 and 35, supporting a large proportion of the working parts, the rest of which are supported below the bed.

*The blank mandrels and their carrier.*— The mandrels on which the blanks are formed into shape by the folding and pressing devices, and the carrier therefor, are preferably located between the side standards 34 and 35, and to this end the latter have formed therein bearing apertures 36 provided with guide surfaces 37 on which are adjustably slidable bearing blocks 38. In the latter are fixed the opposite ends of a shaft 39 extending from side to side of the machine. Below and parallel with this shaft, with its opposite ends extending through and journaled in the side standards, is a second shaft 40. Rotatably carried between collars on the upper shaft 39 are a pair of sprocket wheels 41, one at each side of the machine. Fixed on the lower shaft 40 are a pair of similar sprocket wheels 41ª, one under each of the sprocket wheels 41, and engaging each pair of these vertically alined sprocket wheels is an endless sprocket chain 42. Bolts 38ª, or any other suitable adjusting means are employed to support bearing blocks 38 for adjusting the upper shaft 39 into alinement with the lower shaft and for regulating the tension of the sprocket chains. Secured at their ends to the sprocket chains 42 at spaced points on the latter are a plurality of mandrel bars 43, on each of which are secured, so as to project normally thereof and of the sprocket chains, a pair of blank carrying formers or mandrels 44, spaced from each other on opposite sides of the center of the machine. There are thus provided on the carrier, on each side of the machine, a series of mandrels in alinement with each other in a vertical plane and projecting substantially radially of the carrier, the number of mandrels in each series being preferably selected with reference to the number of devices operating on the blank, as will more fully appear hereafter. In the present instance six such mandrels are provided in each series.

Means, described later, are provided for rotating the lower sprocket shaft 40 intermittently step by step, so that each mandrel is moved to a plurality of successive operating positions in which are located blank feeding mechanism, folding and pressing devices, and receptacle stripping and discharging mechanism, and a dwell is preferably provided in each such position while the latter are operating. The construction and arrangement of the machine frame and carrier are such as to afford support in compact and simple form for a plurality of operating units or series of mandrels with a considerable number of mandrels in each unit or series. Furthermore the flexible construction of the carrier permits it to be moved through such a path that the projecting mandrels when brought to the operating positions are either vertically or horizontally disposed and largely the latter, thus facilitating the arrangement and operation of the folding and pressing devices coöperating therewith. For insuring correct positioning and alinement of the mandrels with reference to the operating devices, the mandrel bars 43 are preferably provided adjacent each end with shoes 45 arranged to engage in sliding contact with vertical guide rails 46 carried on the side standards of the frame.

As in the present embodiment the machine is adapted for the manufacture of containers which are open at one end and folded to close the other, the mandrels employed are preferably in the substantially rectangular or block shape best illustrated in Figs. 16 to 20 having slightly rounded edges so as not to bend the material too sharply.

Means are provided for holding or clamping the blank on the mandrel during the forming operations comprising a pair of lugs 47 on the mandrel bar adjacent each mandrel, in which lugs is journaled at its ends a spindle 48 having fixed thereon an arm 49 to which is pivotally or otherwise secured at its outer end a holding means or plate 50 adapted to be brought by movement of arm 49 into engagement with the blank on the mandrel to secure the latter in place. Similarly on the opposite side of each mandrel bar are provided spaced lugs 51 in which is journaled at its ends a spindle 52, having fixed thereon an arm 53, to the outer end of which is pivotally secured a holding or clamping plate 54 for engaging the blank on the opposite side of the mandrel. The means for actuating the holding means 50 and 54 toward and from the mandrel comprise arms 55 and 56, Fig. 8, fixed on spindles 48 and 52, respectively, and arranged to engage with a plurality of cams, described later on, during the movement of the carrier. Springs 57 and 58 on the said spindles, respectively, urge the holding means toward engagement with the blank on the mandrel, and the arms 55 and 56 into position to engage the actuating cams, which latter move the holding means away from the mandrel for admitting the blank or releasing the folded receptacle at the proper time.

The means for rotating the lower carrier sprocket shaft 40 comprises a ratchet wheel 59, Fig. 1, fixed on the shaft exteriorly of the side standard of the frame, the ratchet having two opposed series of teeth with one of which series coöperates a pawl 60 pivotally carried on an arm 61 and maintained in engagement with the ratchet by a spring 62 connected with the pawl and with the arm. The latter is carried by a hub rotatable on the shaft 40 and having also an arm 63 with which is pivotally connected a link 64 pivotally connected in turn at its other end with a stud 65 fixed eccentrically in a disk 66 keyed or otherwise secured at one end of a main operating shaft 67 rotatably carried beneath the bed 30 of the machine. Coöperating with the other series of teeth on ratchet wheel 59 is a detent 68 pivotally secured on a plate 68ª adjustably supported on the side standard of the frame, a spring 69 being connected with the detent and with the frame for urging the latter into engagement with the ratchet wheel. The detent carries a projection 68ᵇ adapted to engage, in one position of the parts, with arm 63 for retracting the detent from the ratchet wheel. As arm 61 is oscillated in one direction by link 64, pawl 60 rotates the ratchet wheel and thereby shaft 40, intermittently step by step, and as pawl 60 reaches the end of its active stroke, detent 68 is released by the arm 63 and allowed to engage the ratchet wheel to prevent overtravel of the latter, but it is apparent that as arm 61 is oscillated in the opposite or idle direction, arm 63 striking projection 68ᵇ on the detent carries the latter out of engagement with and releases the ratchet wheel to permit the latter to be again turned by pawl 60.

Figure 3:
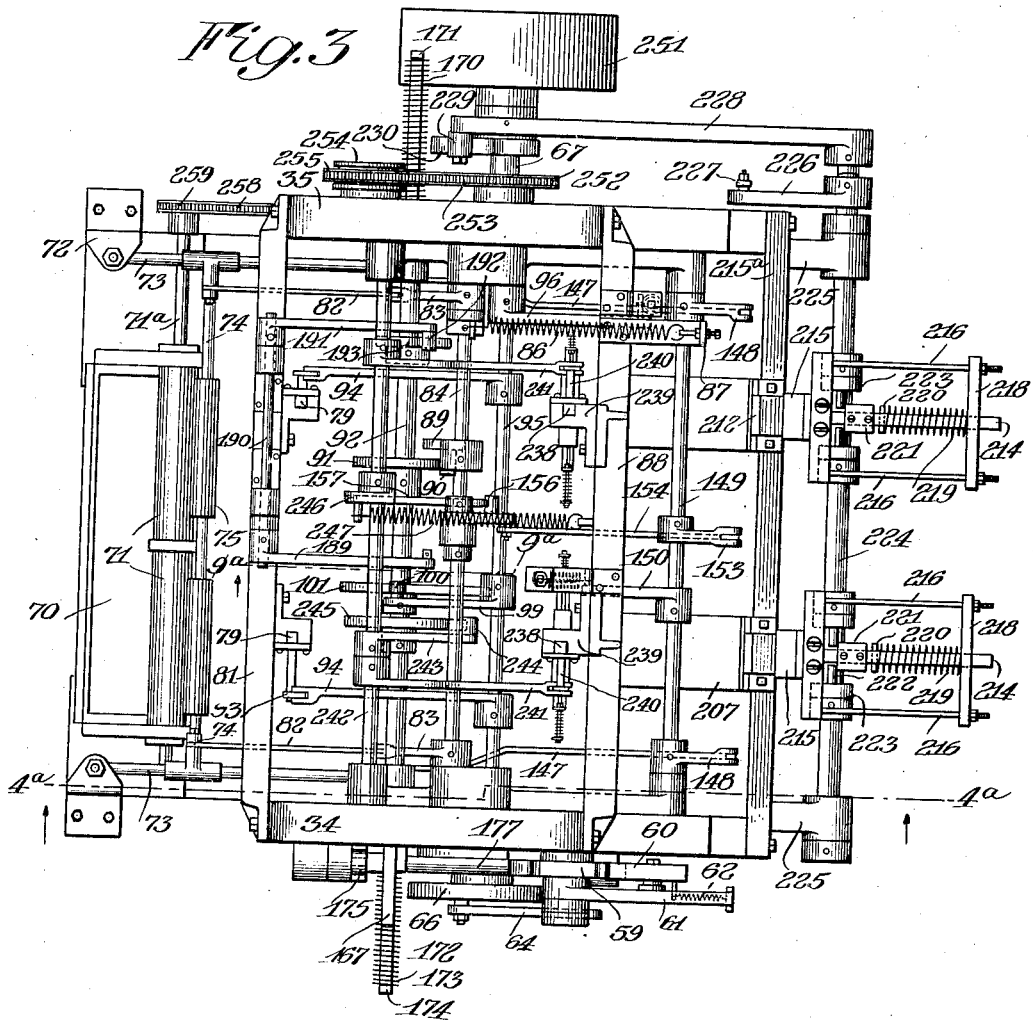
Fig. 3 is a top plan view of the same.

*Blank gumming and feeding mechanism.*— Carried on the forward standard 33 is a glue tank 70 in which are preferably rotated, partially submerged in the glue, a pair of rolls 71 fixed on a shaft 71ª journaled in the sides of the tank and rotated by means described hereafter. Supported by lugs 72 on standard 33 above the glue tank and by lugs 72ª on the side standard, Figs. 3 and 4, are guide rods 73 one adjacent each side of the machine. Slidably supported at each end on one of the guide rods is a rotatable spindle 74 on which are carried glue transfer rolls 75 arranged for engagement with the supply rolls 71 when spindle 74 is moved toward the front of the machine, the spindle being reciprocated on the guide rods by means presently to be described. During movement in the opposite direction, rolls 75 are brought into rolling engagement with glue applying surfaces or pads 76 adjustably supported by means of screws 77, Fig. 6, on plates 78, one for each series of mandrels, carried at the lower end of rods 79 arranged for vertical reciprocation in bearings 80 on a cross bar 81 uniting the side standards. Each rod 79 is reciprocated up and down by means described later to bring the glue applying surfaces 76 into engagement with the uppermost blank of the blank stack, which adheres to the said surfaces so that the blank is separated and elevated above the stack upon upward movement of rod 79, and these glue applying surfaces are so arranged as to apply the glue over the desired areas at the edges of the blank, as illustrated by the shading in Fig. 15.

Glue transfer rolls 75 are preferably reciprocated by means of links 82 pivotally secured to spindle 74 at one end and at the other end to levers 83 fixed on a shaft 84, journaled at its ends in the side standards of the frame, and having also an arm 85 with which is connected a tension spring 86 secured at its other end to a bracket 87 carried by a cross bar 88 connecting the side standards. Shaft 84 has fixed thereon also an arm 89 provided with a roller 90 coöperating with a cam 91 fixed on a cam shaft 92 journaled at its ends in the side standards and rotated by means hereafter described. It is apparent that shaft 90 is rotated, roller 90 being maintained in engagement with the cam by spring 86, arm 83 is oscillated by the cam and by the spring for reciprocating the transfer rolls 75.

The means for reciprocating each rod 79 comprises a link 93 pivotally secured to the rod at one end and at its opposite end to one of a pair of levers 94 fixed on a shaft 95 journaled at its ends in the side standards. Shaft 95 has fixed thereon also an arm 96 with which is connected a tension spring 97 secured to a bracket 98 on the frame. An arm 99 fixed on the shaft carries a roller 100 coöperating with a cam 101 on cam shaft 92, so that by means of this cam and the spring 97, shaft 95 and the arms 94 are oscillated to reciprocate vertically each blank elevating spindle 79 and its glue applying surfaces 76. The operation of this blank separating and elevating means and of the transfer rolls is so coördinated that the rolls engage the surfaces 76 just prior to the descent of the lever and then are moved into contact with supply rolls 71 while the surfaces 76 move downwardly to engage and elevate a blank, which is stripped therefrom by means described hereafter, after which the transfer rolls again apply fresh glue to the surfaces 76.

Figure 7:
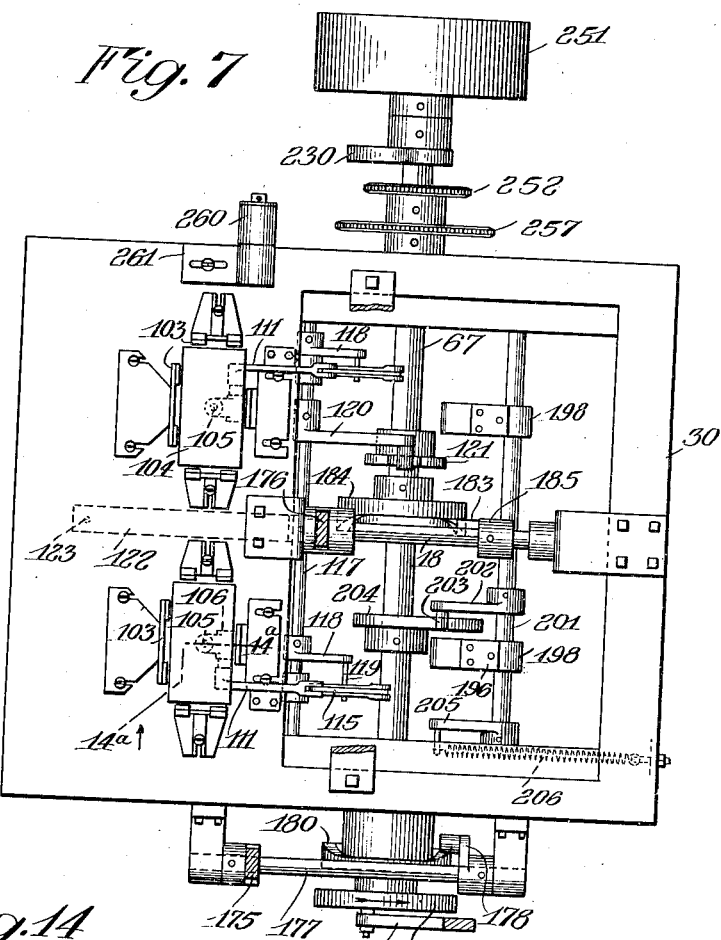
Fig. 7 is a section on the line 7ª—7ª of Fig. 5.
Figure 14:
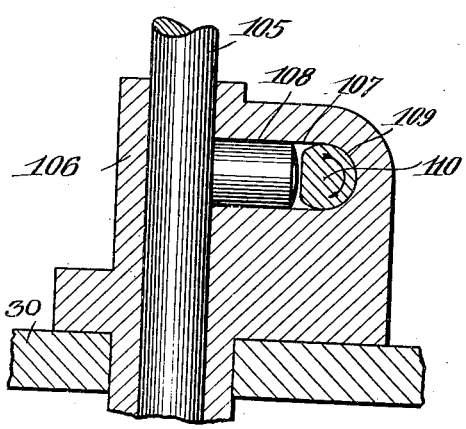
Fig. 14 is an enlarged sectional view on the line 14ª—14ª of Fig. 7, showing the means for controlling the actuation of the blank supply stack.
Figure 9:
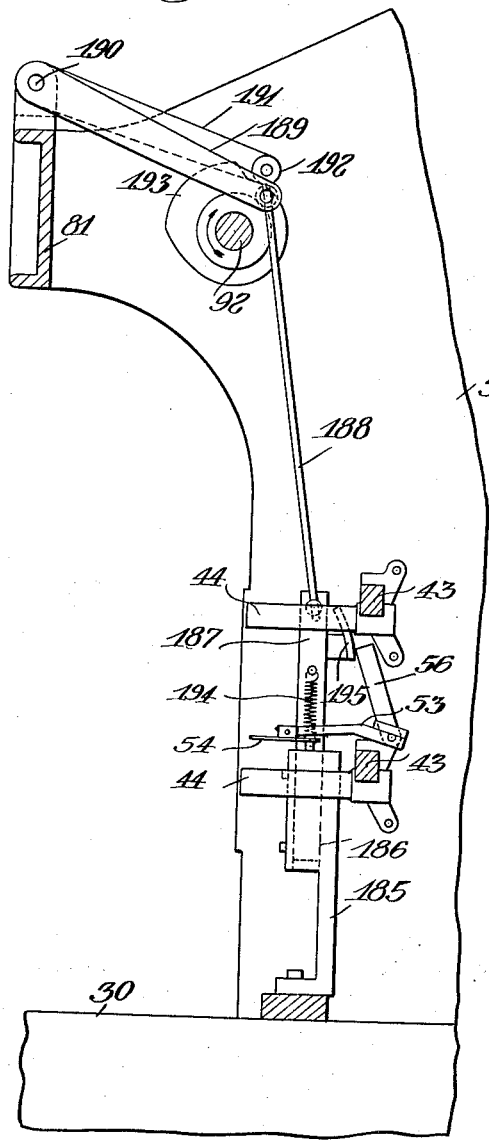
Figs. 9 and 10 are enlarged sectional views on the line 9ª—9ª of Figs. 3 and 6, showing in different working positions an operating means for the devices for clamping the blanks to the mandrels.
Figure 10:
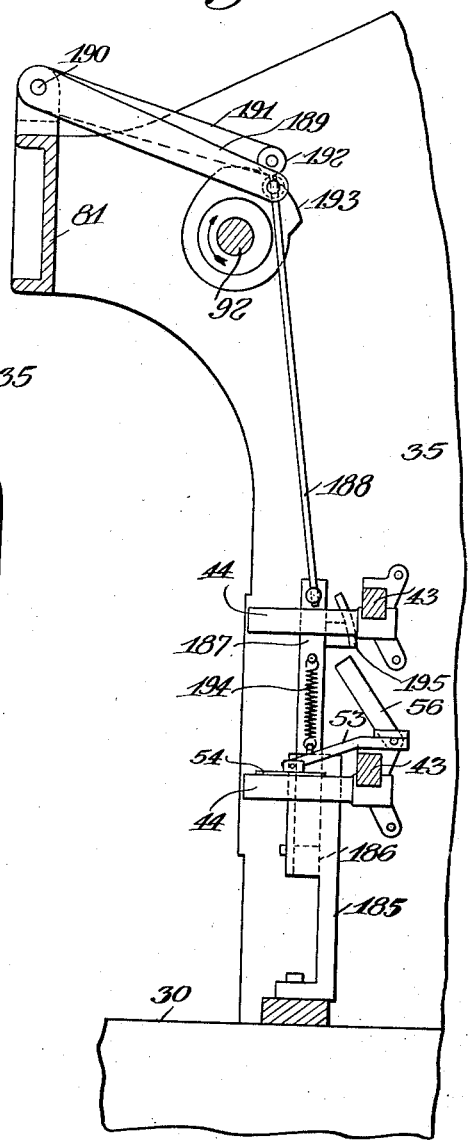
Figure 15:
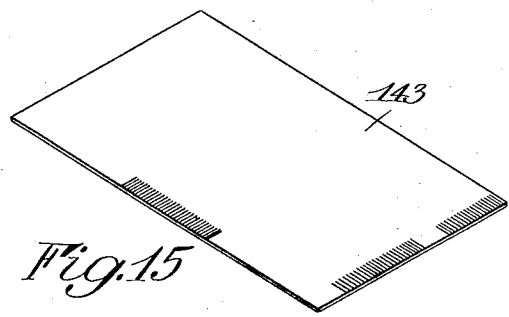

The blanks in the present instance are of the substantially rectangular shape shown in Fig. 15 and a supply of such blanks for each operating unit, or series of mandrels, arranged in a stack 102, Fig. 4, is supported in position in an inclosure formed by resilient strips of metal 103, the stack resting at its bottom on a piston 104 fixed on the upper end of a rod 105 sliding vertically in a bearing 106 on the bed of the machine. As shown in Fig. 14, the opening in bearing 106 in which the rod slides has communicating therewith a transverse bore or opening 107, in which loosely slides a plug 108. Communicating with the outer end of opening 107 and extending transversely thereof is another bore or opening 109, in which is rotatably carried a shaft 110 having the side thereof toward the end of plunger 108 slabbed off, the parts being so constructed and arranged that, with shaft 110 in the position shown in Fig. 14, it does not engage plug 108 and the latter does not forcibly engage the rod 105, so that the latter is free to slide in bearing 106. Rotation of shaft 110, however, from the position shown, in the direction of the arrow, brings the slabbed or flattened surface thereof into engagement with plug 108 thrusting the latter with considerable force against rod 105, thereby clamping the latter stationarily in position until shaft 110 is rotated back to the position shown, to release the rod. Shaft 110 extends beyond bearing 106 and has fixed thereon an actuating member 111, Figs. 4 and 7. A bracket 112 is secured to lever 111 and provided with an opening through which passes a headed bolt 113 extending also through an opening in the bed and below the latter where it carries a compression spring 114 acting to draw the bolt downwardly and thereby maintain lever 111 in lower position. Downward movement of the lever is adjustably limited by a set screw 114$^a$ in bracket 112 so that the lever in its lower position rotates shaft 110 sufficiently to clamp rod 105 as described. The lever may be elevated, however, so as to release the blank stack rod by means of a link 115 pivoted at one end thereto and at its opposite end to one of a pair of arms 116 rotating on a spindle 117 rotatably carried beneath the bed of the machine in yokes 127 depending therefrom and described hereafter. Fixed on spindle 117 is an arm 118 for each blank stack provided with a pin or roller 119 arranged to engage arm 116 from below and slightly raise the latter. Spindle 117 has fixed thereon an arm 120 provided with a roller coöperating with a cam 121 on the main actuating shaft 67. The cam, by rocking lever 120, raises pin 119 through a slight distance, thereby raising arm 116 and releasing the blank stack rod and piston for the instant during which the glue applying and blank elevating surfaces 76 are in engagement with the stack. An arm 122 fixed on spindle 117, and carrying at its other end a set screw 123 striking against the bottom of the bed, serves to limit the movement of the spindle, after the high part of cam 121 passes the roller of arm 120. A tension spring 122$^a$ secured to arm 122 and to the bed normally maintains pin 119 out of contact with arm 116 except at such times as the pin in its upward movement momentarily engages arm 116 and releases the blank stack in the manner described. Rod 105 of each blank stack is extended downwardly below the bed and provided with a connection 124 with respective levers 125 pivotally supported at 126 on yoke 127. Levers 125 extend in rear of their pivotal points and having adjustably hung thereon respective weights 128 which serve to urge the forward ends of the levers upwardly thus placing an upward pressure on the blank stack rods so that when the latter are momentarily released by the mechanism described the upper blank of the stack is pressed against the glue applying and elevating surfaces 76 at the time that the latter are in their lowermost position, thereby constantly adjusting the supply stacks automatically. Levers 125 are provided with handles at their forward ends and the frame carries movable struts 129 so that the forward ends of the levers and therefore the blank stacks may be lowered and held in such position by moving the struts 129 into engagement with the tops of the levers, as is useful in placing a new supply of blanks in position.

As the blank elevating head 78 rises with a blank adhering to its glue applying surfaces, means are provided for stripping the blank therefrom before it reaches its upper limit of movement, so that the blank is discharged into a carriage described hereafter for supplying the same to the mandrels. This stripping means comprises brackets 130, Figs. 4 and 6, secured on the forward standard 33, on which brackets are adjustably secured above each blank stack, stripping plates 131 and 132 having adjustable fingers 133, 133ª and 134, which, together with the main bodies of the plates themselves engage the blank at points distributed over its surface, and particularly adjacent the glued portions thereof, for effectively stripping the blank from the elevating device as the latter passes upwardly. The adjustable fingers provide for the adjustment of the strippers to varying conditions, shapes and sizes of blanks.

A carriage for the blanks is provided and arranged to be moved under the blank stripping means at the time the blank is released thereby, the carriage being supported by means comprising lugs 135 on the forward standard 33 and lugs 135ª on the side standards, on which are supported guide rods 136, one adjacent each side of the machine. Sliding on each of these rods is a sleeve 137, to which are secured the ends of a pair of spaced rods 138. Adjustably clamped on rods 138, Fig. 12, adjacent each blank stack, is a carriage body 139 having spaced extension plates 140. On the opposite sides of each carriage are secured inclined guides 141 so arranged as to guide a blank released above the carriage to a central position on the latter, resting on the plate extensions 140. At the rear of the carriage are attached similar guide plates 142 extending forwardly above the carriage so as to guide and center on the latter a blank dropped on the carriage by the stripping means after the latter has been moved forwardly, the blank being indicated at 143 in dotted lines in Fig. 6 and in full lines in Fig. 12. The forward portion of each carriage at its sides has upwardly and rearwardly extending guide surfaces 144 terminating in downwardly and rearwardly extending surfaces 145, the latter terminating at points above and spaced from the carriage bed, in other words, being somewhat undercut. A light flexible leaf spring 146 is secured on each carriage bed, extending upwardly therefrom forward of the spaced plate extensions 140 and the guide surfaces 145, with a slight forward inclination, for a purpose now to be explained.

Each blank carriage 139 is reciprocated on guide rods 136 in synchronism with the movements of the corresponding blank elevating device, so that just as a blank is released and dropped by the stripper, carriage 139 is moving to a position directly thereunder and the discharged blank drops into position on the carriage, being guided to the proper location thereon by the surfaces 144 and 145 which carry the rear edge of the blank over spring 146, and the blank passes between guides 141 and under guides 142, coming to rest on plate extensions 140, with the forward edge of the blank adjacent spring 146 beneath the projecting surfaces 145. It is also to be noted that the gummed portions of the blank being on its upper surface do not come into engagement with the carriage at all, the blank being supported by the carriage only at its under and ungummed surfaces, so that it does not adhere to the carriage, and by reason of this fact and the resiliency of the spring 146, is yieldably positioned on the carriage to facilitate its coöperation with a final guiding means, supported independently of the carriage, as described below.

The means for reciprocating the blank carriage comprises links 147 at each side of the machine pivotally secured at their forward ends to the carriage rod sleeves 137 and at their rear ends to arms 148 fixed on a shaft 149, Figs. 3 and 4. The latter is journaled at its ends in brackets 149ª on the side standards. Fixed on the shaft is an arm 150 to which is secured a spring 151 fixed at its opposite end to a bracket 152 on the frame, and the shaft also has fixed thereon an arm 153 to which is pivotally connected one end of a link 154, the other end of which is pivotally secured to a lever 155 carrying a roller 156 coöperating with a cam 157 on cam shaft 92, Fig. 5. Spring 151 maintains the roller in engagement with the cam and the latter and the spring thus reciprocate the carriage in timed coördination with the blank gumming and feeding mechanism already described.

The rearward movement of the blank carriage brings the blank thereon into position to be picked up by and secured to the mandrels preparatory to the forming operations. The position of the blank relative to the mandrel at the time of its application thereto affects the depth of the cup-shaped receptacle formed, as well as the accuracy of its folding. The extent to which the blank is moved inwardly of the mandrel beyond its outer end over which the closed end of the receptacle is folded, determines the depth of the receptacle. Furthermore, the arrangement of the leading edge of the blank in a direction normal to the axis of the mandrel affects the accuracy with which the overlapping lateral edges meet at the open end of the receptacle. An important feature of the present invention is the provision of means for insuring presentation of the blank to the mandrel in accurate position and alinement, such means comprising rods, or other frame members, 158, adjustably secured on cross bar 81 of the side standards and extending downwardly and rearwardly on each side of each carriage so as to determine the position of the rear edge of the blank when the carriage reaches its extreme rearward position, or the position in which it applies the blank to the mandrel. Rods 158 are each provided with guide fingers 159 to insure the proper coaction of the blank therewith, and by reason of the fact that the blank is not secured by glue to the carriage and is yieldably held by spring 146, guides 158, coöperating with the latter, accurately adjust the position of the blank on the carriage just prior to the application of the blank to the mandrel. Guide rods 158 being secured to the main frame, which also supports the mandrel carrier, rather than to a moving part such as the carriage, are adapted to thus accurately position the blank with reference to the mandrel so that any inaccuracy in the blank in a direction lengthwise of the receptacle is made to overlap the outer end of the mandrel, so that it is thrown into the end folds and thus prevented from affecting the dimensions of the receptacle.

The movement of the blank feeding carriage and also of the mandrels already described is so coördinated that just before the carriage reaches its rearward position, with the blank accurately positioned thereon, a mandrel is moved to position for coöperation therewith as shown in Fig. 8, and the blank holding or clamping means 150 of the mandrel is held in spaced relation therewith by the engagement of its arm 55 with the surface of a cam member 160 fixed by means of a screw 161 on the upper carrier shaft 39. The cam is preferably formed with a sharp depression 162 in such position that as the mandrel starts to move downwardly between plate extensions 140 of the carriage, carrying the blank with it, arm 55 drops into depression 162 and holding member 150 is moved by its spring to clamp the blank on the mandrel.

Figure 17:
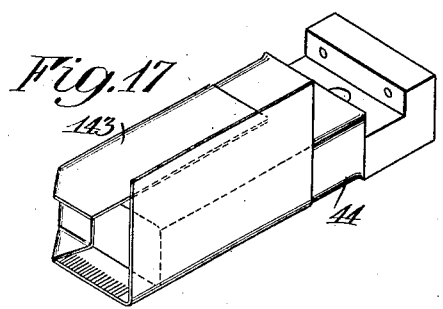

*The blank folding devices.*—As the mandrel moves downwardly with the blank clamped thereto, from the upper left-hand position shown in Fig. 4 and shown also in Fig. 11, it passes between a pair of stationary, resilient folding fingers 163 carried by uprights 164 on the bed of the machine. These fingers continue the initial folding of the blank about the sides, or laterally of the mandrel, taking advantage of the movement of the latter from one position to another to accomplish such folding operation. As the mandrel is very accurate in its dimensions, and as these fingers, due to their resilient character, draw the blank taut about the mandrel, the blank is made to conform accurately thereto. As the mandrel reaches the lower left-hand position, Fig. 8, the lateral folding of the blank thereabout is completed by reciprocating spring fingers 165—165ª which move toward the mandrel, along lines parallel with each other and with the upper surface thereof, and in succession, so that first the left-hand side flap of the blank, Fig. 11, is folded down on the mandrel as shown in Fig. 17. Finger 165ª then folds down the opposite side flap to the position shown in Fig. 18, and the gummed portion of the latter flap thus engages and adheres to the opposite flap which it overlaps.

Figure 18:
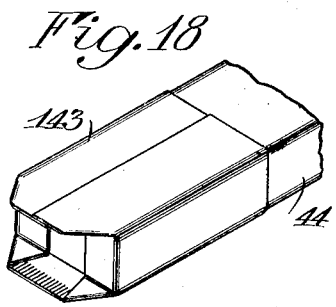
Figure 16:
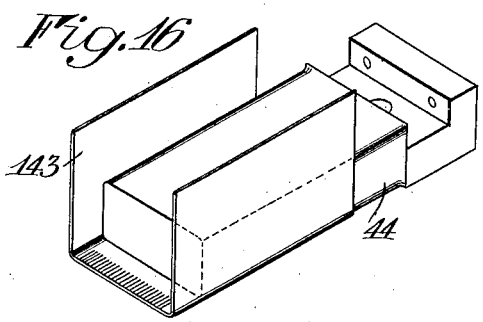

A finger 166 moving simultaneously with finger 165 folds the blank at the same side over the end of the mandrel, as shown in Fig. 17, and, similarly, finger 166ª moving simultaneously with finger 165ª, folds the blank at the corresponding side over the end of the mandrel, thus completing the condition shown in Fig. 18.

Fingers 165 and 166 are carried on brackets on a longitudinally reciprocating bar 167 sliding in bearings in a pair of uprights 168 and 169 on opposite sides of the bed of the machine. At its left-hand end, Fig. 11, bar 167 extends beyond bar 168 and is provided with a spring 170 coiled about the bar between the head 171 at the end of the latter and upright 168 so as normally to carry the fingers out of the path of the mandrel. Similarly fingers 165ª and 166ª are carried by brackets on a longitudinally reciprocating bar 172 supported as in the case of bar 167 and having a spring 173 between a head at its end and the upright 169 for the same purpose.

Means for reciprocating bars 167 and 172 successively, in opposite directions comprise levers 175 and 176 each having a pin and slot connection at its upper end with its respective bar. Lever 175 is fixed on a shaft 177 journaled in brackets on the bed of the frame and having fixed thereon an arm 178 provided with a roller 179 coöperating with a cam 180 on the end of the main actuating shaft 67. Similarly lever 176 is fixed on a shaft 181 journaled in brackets on the bed and having fixed thereto an arm 182 provided with a roller 183 coöperating with a cam 184 fixed on the main actuating shaft 67. As the latter rotates, therefore, levers 175 and 176 are oscillated by their respective cams, thus reciprocating the folding bars 167 and 172 in the manner described.

As the mandrel approaches the operating position of the last described folding mechanism the upper holding member or clamping plate 54 is spaced from the mandrel to permit the folding of the blank by means comprising a post 185 adjacent the center of the bed provided at its upper end with a bearing opening 186 in which is vertically slidable a bar 187. To the upper end of the latter is pivotally secured a link 188 pivoted at its upper end to an arm 189 fixed on a spindle 190 journaled in bearings on the cross bar 81 of the frame. Fixed on said spindle also is an arm 191 carrying a roller 192 coöperating with a cam 193 on cam shaft 92. Thus as the shaft revolves bar 187 is vertically reciprocated, the roller being maintained in engagement with the cam by tension spring 194 secured to the bar and to post 185. Bar 187 carries a cam surface 195 for each series of mandrels located in position to engage arm 56 of holding plate 54, as the mandrel moves to the lower left-hand position, Fig. 8, and to retain the plate spaced from the mandrel while the latter is in such position and the blank is being folded laterally thereabout. As the folding fingers 165 and 165ª, however, are completing their work, bar 187 and its cam 195 are moved upwardly by the action of cam 193 and the connecting parts coöperating therewith, so that the cam is moved out of engagement with arm 56, allowing holding plate 54 to be actuated by its spring into clamping relation with the blank on the mandrel so as to hold the blank folded laterally about the mandrel. The blank then being held in the condition illustrated in Fig. 18, is ready for the next folding operation which occurs in the lowest operating position of the mandrels at the bottom of the carriage.

Figure 19:
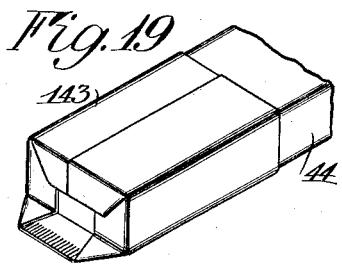

One of the remaining flaps at the end of the mandrel is folded inwardly to the position shown in Fig. 19 by means comprising a resiliently supported plate finger 196 carried at the upper end of rods 197 which are longitudinally slidable in openings in the angular upper end of an arm 198. The rods are provided with adjusting nuts 199 at their lower ends and coiled about the rods between plate and the arm are springs 200 which yieldably support the plate in its uppermost position, so as to apply yielding pressure to the blank as the latter is folded thereby. Arm 198 is fixed on a shaft 201 journaled in the yokes 127 below the bed of the frame, the shaft having fixed thereon also an arm 202 provided with a roller 203 coöperating with a cam 204 fixed on the main actuating shaft 67. Fixed on shaft 201 also is an arm 205 with which and with the frame is connected a tension spring 206 holding the roller against the cam. The cam is so shaped that arm 198 with its plate 196 is swung toward the end of the mandrel as the latter reaches the lowermost position, Fig. 8, and the plate folds inwardly one of the remaining end flaps as described.

Figure 20:
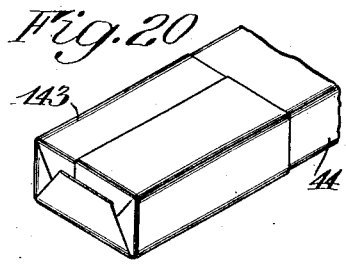

The single remaining end flap with its glued under surface is folded inwardly to complete the receptacle, as shown in Fig. 20, by means comprising a plate 207 provided at its lower end with a resilient finger 208, so shaped as to smoothly engage the flap at its base and fold it closely and evenly over the edge of the end of the mandrel, with sufficient pressure to produce a smooth flat folding of the material. Plate 207 is curved at its lower end on an arc concentric with the lower carrier shaft 40 and thence extends parallel with the path of the mandrel so as to hold the end folds of the receptacle closely in position as the mandrel passes to the next or lower right-hand position shown in Fig. 8. Opposite the end of the mandrel in the latter position and also in the succeeding or upper right-hand position of Fig. 8, plate 127 is provided with apertures 209 and 210, respectively, through which are adapted to be projected pressing fingers 211 and 212 carried at the inner ends of plungers 213 and 214, respectively. These pressing fingers are preferably constructed of a resilient material such, for example, as relatively soft rubber, so that when pressed into engagement with the folded blank by the plungers 213 and 214, the surface of the fingers will conform with and apply to the end folds of the blank a uniform pressure. It is apparent from the above construction that as soon as the folding of the blank is completed both laterally and at the end of the mandrel, pressure is applied to and maintained on the glued folds for a substantial interval of time as the blank passes through succeeding positions for the purpose of holding the folds in position while the glue is setting. A quick drying glue being preferably employed in properly adjusted quantities, the folds are by these means securely fixed in position, thereby obviating subsequent loosening of the fold, and contributing to produce an accurately and securely made container.

Figure 2:
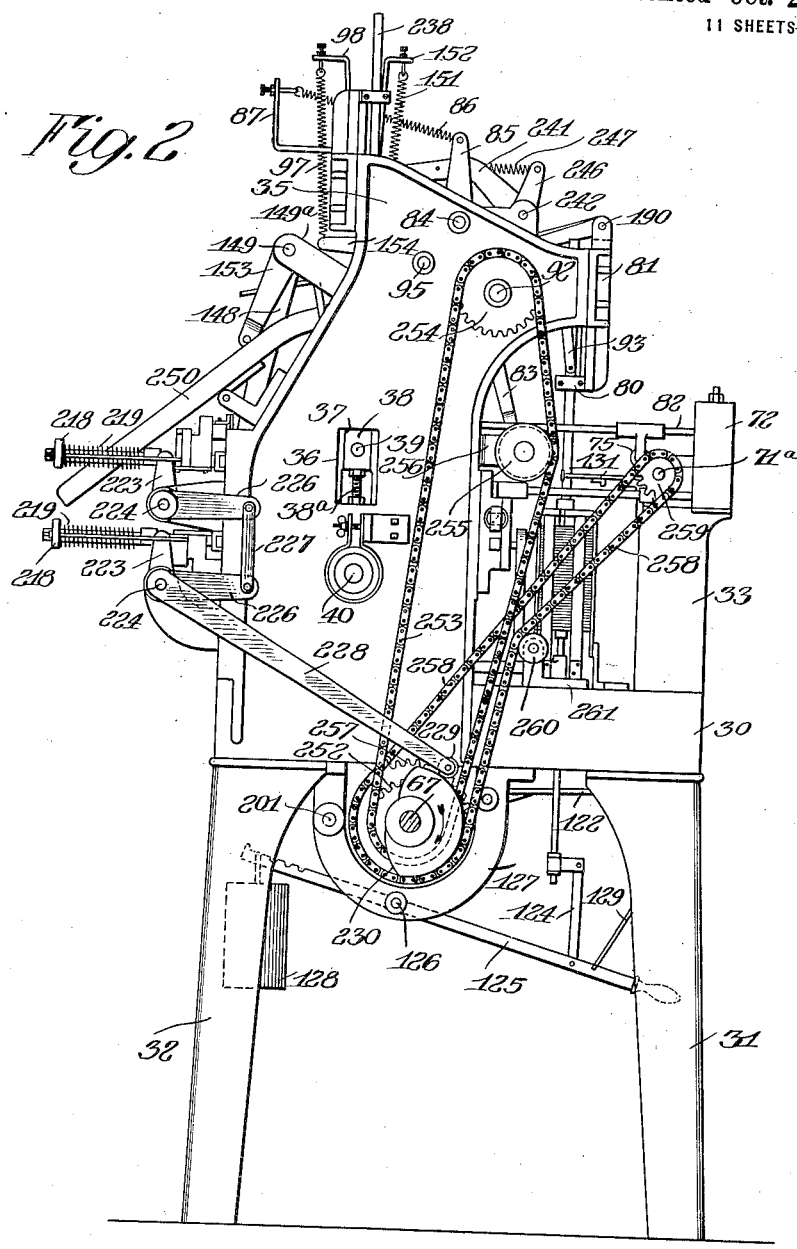
Fig. 2 is a similar view of the opposite side of the machine.

The means for actuating pressing fingers 211 and 212 is substantially the same for each, comprising upper and lower blocks 215 for each series of mandrels in which plungers 213 and 214 are longitudinally slidable. Blocks 215 are supported on cross bars 215ᵃ on the side standards and each block supports at its ends spaced rods 216, Figs. 3 and 5, united at their outer ends by an adjustable cross bar 218. The outer ends of plungers 213 and 214 have sliding bearing in bars 218 and coiled about each plunger is a spring 219 bearing at one end against the bar and at the other against a pin 220 fixed in the plunger, so that the spring presses the plunger and the pressing finger carried thereby toward the mandrel. Each plunger has fixed thereon, however, a block 221 with which engage a pair of pins 222 on opposite sides of the plunger, each carried in the upper end of an arm 223 fixed on a shaft 224 rotating in bearings in brackets 225 on the frame. Fixed on each shaft 224 is an arm 226, Fig. 2, the arms extending parallel with each other and each being pivotally connected with a link 227. The arms being of equal length are thus arranged to rotate equally under the actuation of an arm 228 fixed on the lower shaft 224 and carrying a roller 229 engaging a cam 230 on the main actuating shaft 67. As the latter rotates, therefore, each shaft 224 and the pressing fingers carried thereby are given a small movement so that the latter are retracted out of engagement with the receptacles during the movement of the latter. It is to be noted that the pressing fingers are moved toward and pressed against the blank folds by the resilient springs 219 for applying yielding force to the latter while stationary opposite the finger positions, the fingers being merely retracted by the actuating connections comprising the link 228.

As apparent from the above description, following the position in which the blanks are fed to the mandrel, are a plurality of folding positions, in which are located movable folding devices, and also a plurality of pressing positions in which are located movable devices for applying pressure to the gummed folds of the blank, and intermediate such operating positions there are provided relatively stationary folding and pressing devices adjacent the path of movement of the mandrel from one operating position to another and operating to fold and press the blank by virtue of and during the movement of the latter. Advantage is thus taken of the movement of the blank itself to operate on the same and a saving of time effected in that the blank is, generally speaking, acted upon continuously while in the machine during its movement from position to position, as well as while dwelling in such positions. The blank is thus quickly folded, thereby allowing a substantial period in its passage through the machine during which pressure is maintained on the folds to hold the latter in position and give the glue time to permanently set and secure them in place.

In order that the full and complete character of the forming operations may not reduce the otherwise rapid operation of the machine, a construction and arrangement of the carrier and other parts has been adopted, facilitating the use of a plurality of mandrels equal in number to the operating positions, so that the forming devices operate simultaneously and practically continuously on the different mandrels and the rapidity of production is maintained.

Figure 13:
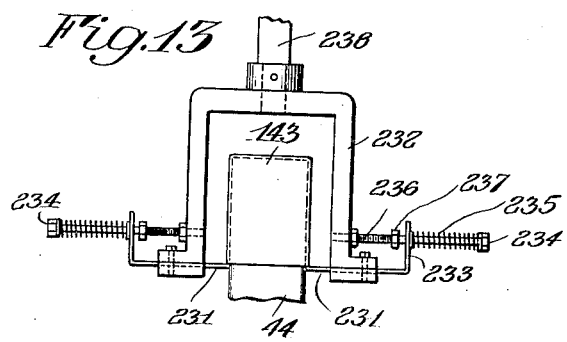
Fig. 13 is an enlarged elevation of one of the devices for stripping completed receptacles from the mandrels.

*The receptacle discharging devices.*—The means for stripping the completed receptacles from the mandrels and discharging them from the machine comprise opposed fingers 231, Figs. 4 and 13, adapted to engage opposite sides of the mandrel below the open end of the receptacle as the mandrel moves to the uppermost position at the top of the carrier. The fingers slide longitudinally in bearings in the lower ends of the arms of yokes 232, one for each series of mandrels. The outer ends of the fingers are turned upwardly and slidably engage studs 234 carried by the yoke between the heads of which studs and the fingers are compression springs 235 moving the fingers toward the mandrel. The studs are provided with threaded portions 236 and nuts 237 thereon adjustably limiting the movement of the fingers toward the mandrel. Yokes 232 are carried on the lower ends of rods 238 sliding longitudinally in spaced bearings 239 on the frame, each rod having pivotally secured thereto a link 240 pivotally connected with an arm 241 fixed on a shaft 242 journaled at its ends in the side standards. Fixed on the shaft is an arm 243 carrying a roller 244 coöperating with a cam 245 on cam shaft 92. Shaft 242 has also fixed thereon an arm 246 with which and with the frame is connected a tension spring 247 for maintaining the roller in engagement with the cam. By this means yoke 232 is vertically reciprocated from the lower mandrel engaging position shown in Fig. 13 to the elevated position of Fig. 5, the stripping fingers 231 in such movement pressing against the sides of the mandrel, engaging the bottom edge of the blank and sliding the same therefrom.

In order to release the blank from the clamping action of the plate 54, prior to the action of the stripper, there is provided a cam plate 248, Figs. 5 and 8, lying in the path of movement of clamping plate arm 56, as the mandrel reaches the upper or stripping position, whereby the clamping plate is retracted from the mandrel. At such time the opposite clamping plate 50 is retracted by the action of the cam 160 previously described, so that the receptacle is left freely slidable on the mandrel for removal therefrom. As it is raised from the latter by the stripper, a spring plate 249 carried on the frame engages the freed receptacle as it rests on the stripping fingers, and tips it over into a discharge trough 250 down which it slides and is discharged at the rear of the machine.

*The main actuating mechanism.*—As previously stated, 67 is the main actuating shaft, carrying some of the means for actuating the various operating parts, while shaft 92 adjacent the top of the machine and termed the cam shaft, carries the other actuating means. Shaft 67 is driven in any suitable manner as, for example, by a pulley 251, Fig. 3, on the shaft, and means are provided for transmitting motion from shaft 67 to cam shaft 92 comprising preferably a sprocket wheel 252 fixed adjacent one end of shaft 67, Figs. 2 and 7, with which engages a sprocket chain 253 engaging also a sprocket 254 on the end of shaft 92. The chain passes over an idle wheel 255 adjustably carried by a bracket 256 on the frame for suitably tensioning the chain.

The means for actuating the supply rolls of the glue tank comprise a sprocket wheel 257 fixed on shaft 67, with which engages a sprocket chain 258 engaging also a sprocket wheel 259 on the shaft 71$^a$ of the supply rolls, an idle wheel 260 being provided and adjustably carried by a bracket 261 on the frame for suitably tensioning the sprocket chain.

The operation of the machine has been sufficiently described above to make the same clear and it is apparent that it is fully automatic, with parts so constructed and arranged as to combine rapidity of manufacture with accuracy and efficiency of the product. Advantage is taken of the movement of the blank from one operating position to another to continuously and rapidly fold the same by a compact efficient mechanism, following which the folded receptacle is maintained under repeated and sustained pressure on its way through the machine until the glue has set and secured the folds in place. The mandrel carrier and associated parts are so constructed and arranged as to facilitate the use in convenient positions of a relatively large number of mandrels and a corresponding number of forming devices operating simultaneously to effect complete and rapid handling of the receptacles. The blanks are rapidly and accurately fed to the mandrels and accurately formed thereon to produce a neat and efficient container. While but two operating units or series of mandrels are shown in the present instance, the use of spaced frame standards with extended operating shafts supported thereon affords a construction making practical the provision of two or more such units as may be found desirable in the interest of economy of parts and increased rate of production. The above described details of construction and mode of operation of the machine and its parts are merely by way of illustration of one embodiment of the invention which is by no means to be limited thereto as various possible modifications are contemplated falling within the spirit of the invention as set forth in the claims.

We claim as our invention:

1. In a receptacle making machine, a plurality of spaced blank folding devices, a movable mandrel for holding and shaping blanks having a continuous movement past certain of said devices to bring a blank into folding engagement therewith and having a dwell in its movement adjacent others of said devices during folding operations by the latter, and actuating means for said mandrel and said other folding devices.

2. In a receptacle making machine, a plurality of spaced blank folding devices, a plurality of movable mandrels for holding and shaping blanks having a continuous movement past certain of said devices to bring blanks into folding engagement therewith and having dwells in their movement adjacent others of said devices during folding operations by the latter, and actuating means for said mandrels and said other devices.

3. In a receptacle making machine, a plurality of spaced blank folding devices, a plurality of movable mandrels for holding and shaping blanks having a continuous movement past certain of said devices to bring blanks into folding engagement therewith and having dwells in their movement adjacent others of said devices during folding operations by the latter, actuating means for said mandrels and said other devices, feeding means for supplying blanks to said mandrels, and stripping means for removing completed receptacles therefrom.

4. In a receptacle making machine, a plurality of spaced blank folding devices some of which are stationary and others movable, a plurality of movable mandrels for holding and shaping blanks having a continuous movement past said stationary devices to bring the blanks into folding engagement therewith and having dwells in their movement adjacent said movable devices during folding operations by the latter, and actuating means for said mandrels and said movable devices.

5. In a receptacle making machine, a plurality of spaced blank folding devices some of which are stationary and others movable, a plurality of movable mandrels for holding and shaping blanks having a continuous movement past said stationary devices to bring the blanks into folding engagement therewith and having dwells in their movement adjacent said movable devices during folding operations by the latter, actuating means for said mandrels and said movable devices, feeding means for supplying blanks to said mandrels, and stripping means for removing completed receptacles therefrom.

6. In a receptacle making machine, spaced blank folding devices some of which are stationary and others movable, blank pressing devices, a plurality of movable mandrels for holding and shaping blanks having a continuous movement past said stationary folding devices to bring the blanks into folding engagement therewith and having dwells in their movements adjacent said movable folding devices and said pressing devices during operations thereby, actuating means for said mandrels, movable folding devices and pressing devices, blank gumming and feeding means for supplying gummed blanks to said mandrels, and stripping means for removing completed receptacles from said mandrels.

7. In a receptacle making machine, a plurality of movable blank folding devices, a carrier having a mandrel and movable to position said mandrel for coöperation with said devices in succession, means for actuating said devices when in coöperating position relative to the mandrel for folding the blank, stationary devices operating to fold the blank by the movement of the mandrel, actuating means for the carrier, and feeding mechanism for supplying blanks to the mandrel.

8. In a receptacle making machine, a plurality of spaced blank folding devices, a carrier provided with a mandrel and having an intermittent movement to position said mandrel for coöperation with said devices in succession with a dwell in each coöperative position, actuating means for said devices for folding the blank during said dwells in the movement thereof, actuating means for said carrier, additional devices coöperating with said mandred to fold the blank during movement thereof, and feeding mechanism for supplying blanks to said mandrel.

9. In a receptacle making machine, a plurality of movable blank folding devices, a carrier having a mandrel and movable to position said mandrel for coöperation with said devices in succession, means for actuating said devices when in coöperating position relative to the mandrel for folding the blank, a plurality of stationary fingers disposed in the path of movement of the blank and operating to fold the latter by the movement of the mandrel, actuating means for the carrier, and feeding mechanism for supplying blanks to the mandrel.

10. In a receptacle making machine, a plurality of movable blank folding devices, a carrier having a plurality of mandrels and movable to position said mandrels for coöperation with said devices in succession, means for actuating said devices when in coöperating position relative to the mandrels for folding the blank, a plurality of stationary resilient devices disposed in the path of movement of the blank and operating to fold the latter by the movement of the mandrels, actuating means for the carrier, and feeding mechanism for supplying blanks to the mandrels.

11. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, movable devices coöperating with said stationary devices to complete the lateral folding of the blank, additional devices for folding the blank over the end of the mandrel, actuating means for said carrier and movable devices, and feeding mechanism for supplying blanks to said mandrel.

12. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, movable devices coöperating with said stationary devices to complete the lateral folding of the blank, additional movable devices for folding the blank over the end of the mandrel, an additional stationary device for completing and holding the end folds during movement of the mandrel, actuating means for said carrier and movable devices, and feeding mechanism for supplying blanks to said mandrel.

13. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, devices movable from opposite sides of the mandrel for completing the lateral folding of the blank, movable devices operating simultaneously with said first movable devices respectively for folding the blank at said opposite sides over the end of the mandrel, additional devices for completing the end folds of the blank, actuating means for said carrier and movable devices, and feeding mechanism for supplying blanks to said mandrel.

14. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, devices movable in succession from opposite sides of the mandrel for completing said lateral folding and simultaneously folding the blank over the end of the mandrel, additional devices for completing the end folding of the blank, and feeding mechanism for supplying blanks to the mandrel.

15. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, devices movable in succession from opposite sides of the mandrel parallel with an adjacent face thereof for completing said lateral folding, devices movable successively from said opposite sides of the mandrel for folding the blank at said opposite sides over the end of the mandrel, additional devices for completing the end folds of the blank, actuating means for said carrier and movable devices, and feeding mechanism for supplying blanks to said mandrel.

16. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, members movable successively from opposite sides of the mandrel and each provided with devices for completing said lateral folding and also folding the blank at said opposite sides over the end of the mandrel, additional devices for completing the end folding of the blank, and feeding mechanism for supplying blanks to said mandrel.

17. In a receptacle making machine, a carrier having a mandrel thereon and movable to bring said mandrel to a plurality of operating positions in succession, relatively stationary folding devices operating by the movement of the mandrel to initially fold the blank about the sides of the mandrel, reciprocating members movable successively from opposite sides of the mandrel along parallel lines and each provided with devices for completing said lateral folding and also folding the blank at said opposite sides over the end of the mandrel, additional devices for completing the end folding of the blank, and feeding mechanism for supplying blanks to said mandrel.

18. In a receptacle making machine, a carrier having a mandrel thereon and movable to bring said mandrel to a plurality of operating positions in succession, stationary folding devices comprising resilient fingers operating during the movement of the mandrel to fold and draw the blank closely about the sides thereof, members movable from oposite sides of the mandrel also comprising resilient fingers for closely and accurately completing said lateral folding and folding the blank at said opposite sides over the end of the mandrel, and additional devices for completing the end folding of the blank.

19. In a receptacle making machine, a carrier having a mandrel thereon and movable to bring said mandrel to a plurality of operating positions in succession, stationary folding devices comprising resilient fingers operating during the movement of the mandrel to fold and draw the blank closely about the sides thereof, members movable from opposite sides of the mandrel also comprising resilient fingers for closely and accurately completing said lateral folding and folding the blank at said opposite sides over the end of the mandrel, additional devices for completing the end folding of the blank, a plurality of devices for pressing the blank folds, and blank gumming and feeding means for supplying gummed blanks to the mandrel.

20. In a receptacle making machine, a carrier provided with a mandrel and movable to bring said mandrel to a plurality of successive operating positions, stationary folding devices operating by the movement of said mandrel to fold the blank thereabout, movable folding devices adjacent said operating positions coöperating with said stationary devices to complete the folding of the blank, means for pressing the blank folds, blank gumming and feeding means for supplying gummed blanks to said mandrel, and actuating means for said carrier, movable folding devices and pressing means.

21. In a receptacle making machine, a carrier provided with a mandrel and movable to bring said mandrel to a plurality of successive operating positions, stationary folding devices operating by the movement of said mandrel to fold the blank laterally thereabout, movable folding devices coöperating with said stationary devices to complete the lateral folding of the blank, movable devices for folding the blank over the end of the mandrel, stationary means for completing and holding the end folds during movement of the mandrel, and actuating means for said carrier and movable devices.

22. In a receptacle making machine, a carrier provided with a mandrel and movable to bring said mandrel to a plurality of successive operating positions, stationary folding devices operating by the movement of said mandrel to fold the blank laterally thereabout, devices movable from opposite sides of the mandrel for completing the lateral folding of the blank, a device movable simultaneously with each of said first movable devices for folding the blank at said opposite sides over the end of the mandrel, an additional movable device for folding the blank over the end of the mandrel, an additional stationary device for completing and holding said end folds during the movement of the mandrel, and actuating means for said movable devices and carrier.

23. In a receptacle making machine, a carrier provided with a mandrel and movable to bring said mandrel to a plurality of successive operating positions, stationary folding devices operating by the movement of said mandrel to fold the blank laterally thereabout, devices movable in succession from opposite sides of the mandrel for completing said lateral folding and simultaneously folding the blank over the end of the mandrel, an additional movable device for folding the blank over the end of the mandrel, an additional stationary device for completing and holding said end folds during the movement of the mandrel, and actuating means for said movable devices and carrier.

24. In a receptacle making machine, a carrier provided with a mandrel and movable to bring said mandrel to a plurality of successive operating positions, stationary folding devices operating by the movement of said mandrel to fold the blank laterally thereabout, members movable successively from opposite sides of the mandrel and each provided with devices for completing said lateral folding and also folding the blank at said opposite sides over the end of the mandrel, an additional movable device for folding the blank over the end of the mandrel, an additional stationary device for completing and holding said end folds during the movement of the mandrel, and actuating means for said movable devices and carriers.

25. In a receptacle making machine, a carrier provided with a mandrel and movable to bring said mandrel to a plurality of successive operating positions, stationary folding devices having yielding means adapted during the movement of the mandrel to draw the blank closely thereabout, movable folding devices adjacent said operating positions coöperating with said stationary devices and also having yielding means adapted to draw the blank closely about the mandrel and complete the folding thereof, blank gumming and feeding means for supplying gummed blanks to said mandrel and yielding means for applying repeated pressure to the gummed folds of the blank to fix the latter securely in position.

26. In a receptacle making machine, a carrier provided with a plurality of blank holding and shaping mandrels and movable to bring each mandrel to a plurality of successive operating positions, blank feeding means adapted for supplying gummed blanks to said mandrels, a plurality of devices adjacent said operating positions movable to fold the blanks about the mandrels, additional folding means in the path of the blanks for folding the latter during the movement of the mandrels from one position to another, and a plurality of yielding devices arranged to apply repeated pressure to the folded blanks to set the folds thereof securely in position.

27. In a receptacle making machine, a carrier provided with a plurality of blank holding and shaping mandrels and movable to bring each mandrel to a plurality of successive operating positions, blank feeding means adapted for supplying gummed blanks to said mandrels, a plurality of devices adjacent said operating positions movable to fold the blanks about the mandrels, additional folding means in the path of the blanks for folding the latter during the movement of the mandrels from one position to another, a plurality of yielding devices arranged to apply repeated pressure to the folded blanks to set the folds thereof securely in position, stripping means for removing the completed blanks from the mandrels, and actuating means for said movable folding devices, blank feeding and stripping means and carrier.

28. In a receptacle making machine, a carrier provided with a plurality of mandrels and movable to bring said mandrels to a plurality of successive operating positions, feeding means adapted to supply gummed blanks to said mandrels at one of said operating positions, a plurality of blank folding devices at said positions, a plurality of devices at said positions for applying repeated pressure to folded portions of said blanks for fixing the latter in place during the setting of the gum stripping means at one of said positions for removing the blanks from said mandrels, said mandrels being equal in number to said operating positions for presenting blanks simultaneously at each of said positions and thereby maintaining the speed of production of the machine, and actuating means for said devices, means and carrier.

29. In a receptacle making machine, blank gumming and feeding means, blank folding means, a plurality of devices for applying repeated pressure to folded portions of the blanks for holding the latter in position during the setting of the gum, blank stripping means, a carrier having a plurality of mandrels equal in number to said operating means and devices for presenting blanks simultaneously to the latter and thereby maintaining the speed of production of the machine, actuating means for moving the carrier to bring said mandrels to said operating means and devices in succession, and mechanism for actuating said means and devices.

30. In a receptacle making machine, a carrier provided with a plurality of mandrels and movable to bring said mandrels to a plurality of successive operating positions, feeding means adapted to supply gummed blanks to said mandrels at one of said operating positions, blank folding means at said positions, a plurality of devices at said positions comprising yielding rubber pads for applying repeated pressure to folded portions of said blanks for holding the latter in place during the setting of the gum, stripping means at one of said positions for removing the blanks from the mandrels, said mandrels being substantially equal in number to said operating positions for presenting blanks simultaneously at each of said positions and thereby maintaining the speed of production of the machine, and actuating means for said devices, means and carrier.

31. In a receptacle making machine, a carrier provided with a plurality of mandrels and movable to bring said mandrels to a plurality of successive operating positions, feeding means adapted to supply gummed blanks to said mandrels at one of said operating positions, movable blank folding means at said positions, stationary blank folding means intermediate said positions for folding the blanks during movement of the mandrels, a plurality of devices at said positions comprising yieldably supported rubber pads for applying repeated pressure to folded portions of said blanks for holding the latter in position during the setting of the gum, stripping means at one of said positions for removing the blanks from the mandrels, said mandrels being substantially equal in number to said operating positions for presenting blanks simultaneously at each of said positions and thereby maintaining the speed of production of the machine, and actuating means for said devices, movable means and carrier.

32. In a receptacle making machine, a carrier provided with a plurality of mandrels and movable to bring said mandrels to a plurality of successive operating positions, blank gumming and feeding means for supplying gummed blanks to the mandrels, devices for folding the blanks over the sides and ends of the mandrels, a plurality of spring actuated devices comprising pads of yielding material for applying repeated pressure to folded portions of the blanks to secure the latter in position as the gum sets, operating means for intermittently retracting and releasing said spring actuated pressure devices, and actuating means for said feeding means, carrier and folding devices.

33. In a receptacle making machine, a main frame, a blank holding and shaping mandrel movably supported thereon, blank feeding means for supplying blanks to the mandrel, blank guiding means adjustably carried on said frame for accurately positioning the edge of the blanks forming the open end of the receptacle with reference to the mandrel whereby inaccuracies in the blanks are disposed in the folded portions thereof, devices for folding the blanks about the sides and end of the mandrel, and stripping means for removing the blanks therefrom.

34. In a receptacle making machine, a main frame, a blank holding and shaping mandrel movably supported thereon, blank feeding means for supplying blanks to the mandrel, blank guiding means adjustably carried on said frame for accurately positioning the edge of the blanks forming the open end of the receptacle with reference to the mandrel whereby inaccuracies in the blanks are disposed in the folded portions thereof, blank clamping means movable with the mandrel for holding the blanks thereon, devices for folding the blanks about the sides and end of the mandrel, and stripping means for removing the blanks therefrom.

35. In a receptacle making machine, a main frame, a blank holding and shaping mandrel movably supported thereon, blank feeding means comprising a reciprocating carriage for supplying blanks to the mandrel, blank guiding means adjustably carried on said frame and coöperating with said carriage for accurately positioning the edge of the blanks forming the open end of the receptacle with reference to the mandrel whereby inaccuracies in the blanks are disposed in the folded portions thereof, devices for folding the blanks about the sides and end of the mandrel, and actuating means for said feeding means, mandrel carriage and folding devices.

36. In a receptacle making machine, a main frame, a blank holding and shaping mandrel movably supported thereon, a movable carriage for supplying blanks to the mandrel, blank gumming and feeding means for supplying blanks one at a time to said carriage with the gummed portions thereof free from contact with the carriage, blank guiding means on said frame coöperating with said carriage for accurately positioning the edge of the blanks forming the open end of the receptacle with reference to the mandrel whereby inaccuracies in the blanks are disposed in the folded portions thereof, devices for folding the blanks about the sides and end of the mandrel and means for actuating said parts.

37. In a receptacle making machine, a main frame, a blank holding and shaping mandrel movably supported thereon, a movable carriage for supplying blanks to the mandrel comprising yieldable blank positioning means, blank gumming and feeding means for supplying blanks one at a time to said blank positioning means on the carriage with the gummed portions of the blank free from contact with the carriage, blank guiding means adjustably carried on the frame and coöperating with said yieldable blank positioning means on the carriage for accurately positioning the edge of the blanks forming the open end of the receptacle with reference to the mandrel whereby inaccuracies in the blanks are disposed in the folded portions thereof, devices for folding the blanks about the sides and ends of the mandrel, and means for actuating said parts.

38. In a receptacle making machine, blank folding devices, a movable mandrel coöperating with said devices to fold the blanks, a blank stack support, a plunger for lifting blanks from said stack, means for applying glue to said plunger, stripping means for separating lifted blanks from said plunger, a reciprocating carriage adapted to receive blanks released by said stripping means and to feed the same to said mandrel, and means for operating said parts.

39. In a receptacle making machine, blank folding devices, a movable mandrel coöperating with said devices to fold the blanks, a blank stack support, a plunger for lifting blanks from said stack, means for applying glue to said plunger, resilient means tending to move said support toward said plunger, restraining means for said support arranged to release the latter when said plunger engages the blanks thereon, stripping means for separating lifted blanks from said plunger, a reciprocating carriage adapted to receive blanks released by said stripping means and to feed the same to said mandrel, and means for operating said parts.

40. In a receptacle making machine, blank folding devices, a movable mandrel coöperating with said devices to fold the blanks, a blank stack support, a plunger for lifting blanks from said stack, provided with a plurality of adjustable blank engaging surfaces, means for applying glue to said surfaces, stripping means arranged to embrace said blank engaging surfaces in the upper position of said plunger for separating blanks therefrom, a reciprocating carriage adapted to receive blanks released from said plunger and to feed the same to said mandrel, and means for operating said parts.

41. In a receptacle making machine, blank folding devices, a movable mandrel coöperating with said devices to fold the blanks, a blank stack support, a plunger for lifting blanks from said stack, means for applying glue to said plunger, stripping means for separating lifted blanks from said plunger, a reciprocating carriage provided with yieldable blank holding means adapted to receive blanks released by said stripping means and to present the same to said mandrel, adjustable guide means coöperating with said blank holding means on the carriage for accurately positioning the blanks relative to said mandrel, and means for operating said parts.

42. In a receptacle making machine, blank folding devices, a movable mandrel coöperating with said devices to fold the blanks, a blank stack support, a plunger for lifting blanks from said stack, means for applying glue to said plunger, stripping means for separating lifted blanks from said plunger, a reciprocating carriage adapted to receive blanks released by said stripping means and to feed the same to said mandrel, clamping means movable with mandrel for securing the blanks thereto, and means for operating said parts.

43. In a receptacle making machine, blank folding devices, a movable mandrel coöperating with said devices to fold the blanks, a blank stack support, a plunger for lifting blanks from said stack, means for applying glue to said plunger, stripping means for separating lifted blanks from said plunger, a reciprocating carriage provided with yieldable blank holding means adapted to receive blanks released by said stripping means and to present the same to said mandrel, adjustable guide means coöperating with said blank holding means on the carriage for accurately positioning the blanks relative to said mandrel, clamping means movable with said mandrel for securing the blanks thereto, and means for operating said parts.

44. In a receptacle making machine, a movable blank holding and shaping mandrel, feeding means presenting yieldably supported gummed blanks to said mandrel, guide means for accurately positioning the blanks relative to said mandrel, clamping means for securing the unfolded blanks to said mandrel, folding means for wrapping the blanks about the mandrel, additional clamping means for securing folded portions of the blanks in position on the mandrel, stripping means for removing folded blanks from the mandrel, and actuating means for said clamping means operating to release the folded blanks for removal thereof by said stripping means.

45. In a receptacle making machine, a movable blank holding and shaping mandrel, feeding means presenting yieldably supported gummed blanks to said mandrel, guide means for accurately positioning the blanks relative to said mandrel, clamping means for securing the unfolded blanks to said mandrel, folding means for wrapping the blanks about the mandrel, additional clamping means for securing folded portions of the blanks in position in the mandrel, a plurality of pressing devices for applying repeated pressure to folded portions of the blanks during the setting of the gum, and means for actuating said parts.

46. In a receptacle making machine, a movable blank holding and shaping mandrel, feeding means presenting yieldably supported gummed blanks to said mandrel, guide means for accurately positioning the blanks relative to said mandrel, clamping means for securing the unfolded blanks to said mandrel, folding means for wrapping the blanks about the mandrel, additional clamping means for securing folded portions of the blanks in position on the mandrel, a plurality of pressing devices for applying repeated pressure to folded portions of the blanks during the setting of the gum, stripping means for removing folded blanks from the mandrel, and actuating means for said clamping means operating to release the folded blanks for removal thereof by said stripping means.

47. In a receptacle making machine, a carrier comprising an endless flexible member provided with a plurality of mandrels, said carrier being movable to bring said mandrels to a plurality of operating positions in succession, feeding means for supplying gummed blanks to said mandrels, movable blank folding devices adjacent said operating positions, stationary devices in the path of said mandrels intermediate said positions for folding the blanks during movement of said carrier, guiding and supporting means for said flexible member and mandrels, and means for actuating the moving parts.

48. In a receptacle making machine, a flexible carrier provided with a plurality of mandrels and movable to bring said mandrels to a plurality of operating positions in succession, guiding means for the carrier effecting horizontal and vertical disposition of the mandrels in said operating positions, feeding means for supplying gummed blanks to said mandrels, movable blank folding devices adjacent said operating positions, stationary devices in the path of said mandrels intermediate said positions for folding the blanks during movement of the carrier, and means for actuating the moving parts.

49. In a receptacle making machine, a flexible mandrel carrier, a plurality of operating positions on opposite side of said carrier, means for moving the carrier to bring its mandrels to said operating positions in succession, guiding means for the carrier effecting disposition of a plurality of mandrels in parallel relation with each other in said operating positions on each side of the carrier, feeding means for supplying gummed blanks to the mandrels, blank folding devices adjacent said operating positions, blank stripping means, and actuating means for said folding devices and feeding and stripping means.

50. In a receptacle making machine, a carrier provided with a mandrel and movable to bring said mandrel to a plurality of successive operating positions, stationary folding devices operating by the movement of said mandrel to fold the blank thereabout, movable folding devices adjacent said operating positions coöperating with said stationary devices to complete the folding of the blank, a member of yieldable material for pressing the blank folds, feeding means for supplying gummed blanks to said mandrel, and actuating means for said operating parts.

51. In a receptacle making machine, a carrier provided with a mandrel and movable to bring said mandrel to a plurality of successive operating positions, stationary folding devices operating by the movement of said mandrel to fold the blank thereabout, movable folding devices adjacent said operating positions coöperating with said stationary devices to complete the folding of the blank, a resiliently supported member of yieldable material for pressing the blank folds, feeding means for supplying gummed blanks to said mandrel, stripping means for removing completed receptacles therefrom, and actuating means for the operating parts.

52. In a receptacle making machine, a carrier provided with a mandrel and movable to bring said mandrel to a plurality of successive operating positions, movable folding devices adjacent said operating positions, stationary folding devices intermediate said positions operating by the movement of the mandrel to fold the blank thereabout, means for holding the blank in folded relation, resiliently supported means of yieldable material for pressing the blank folds, blanks feeding and stripping means, and actuating means for the operating parts.

53. In a receptacle making machine, a plurality of blank folding and pressing devices, a carrier having a plurality of blank mandrels and movable to present said mandrels to said devices in succession, feeding means for supplying gummed blanks to said mandrels, blank stripping means comprising resilient spaced fingers arranged to engage opposite sides of a mandrel during movement of the latter adjacent the inner side of the blank, means for reciprocating said stripping means in coöperation with each succeeding mandrel for stripping the blank therefrom and actuating means for said carrier, devices and feeding means.

54. In a receptacle making machine, a frame comprising spaced standards, supporting elements carried in parallel relation therebetween, a plurality of operating units on said elements spaced longitudinally thereof, each of said units comprising a plurality of blank carrying mandrels and coöperating blank manipulating devices, a plurality of cams on one of said elements, actuating means for said cams, and operative connections between said cams and each of said units.

55. In a receptacle making machine, a frame comprising spaced standards, a plurality of parallel shafts having their ends carried in said standards, a plurality of operating units on said shafts spaced longitudinally thereof, each of said units comprising a plurality of blank carrying mandrels and coöperating blank manipulating devices, additional blank manipulating devices for each unit on said frame, a plurality of cams on said shafts, actuating means for said cams and for said units, and operative connections between said cams and said blank manipulating devices of the units and on said frame.

HARRY A. INMAN.
WILLIAM H. INMAN.